United States Patent
Veal et al.

(10) Patent No.: US 6,786,456 B2
(45) Date of Patent: Sep. 7, 2004

(54) DEPLOYABLE INFLATABLE BOOM AND METHODS FOR PACKAGING AND DEPLOYING A DEPLOYABLE INFLATABLE BOOM

(75) Inventors: Gordon Veal, Rancho Santa Margarita, CA (US); Arthur Palisoc, Irvine, CA (US); William Derbes, Healdsburg, CA (US)

(73) Assignee: L'Garde, Inc., Tustin, CA (US)

( * ) Notice: Subject to any disclaimer, the term of this patent is extended or adjusted under 35 U.S.C. 154(b) by 0 days.

(21) Appl. No.: 10/234,047

(22) Filed: Aug. 29, 2002

(65) Prior Publication Data

US 2004/0046085 A1 Mar. 11, 2004

(51) Int. Cl.$^7$ .................................................. B64G 1/64
(52) U.S. Cl. .................... 244/159; 244/161; 244/158 R; 52/2.21
(58) Field of Search .............................. 244/158 R, 159, 244/160, 161; 52/2.21, 2.22, 2.23, 2.24

(56) References Cited

U.S. PATENT DOCUMENTS

| | | | | |
|---|---|---|---|---|
| 3,202,998 A | * | 8/1965 | Hoffman | 343/833 |
| 3,389,877 A | * | 6/1968 | Huber et al. | 244/158 R |
| 3,606,719 A | * | 9/1971 | Berry | 52/632 |
| 4,770,374 A | * | 9/1988 | Regipa | 244/158 R |
| 5,580,013 A | * | 12/1996 | Velke | 244/159 |
| 6,318,674 B1 | * | 11/2001 | Simburger | 244/158 R |
| 6,499,697 B1 | * | 12/2002 | Patel et al. | 244/158 R |
| 6,568,640 B1 | * | 5/2003 | Barnett | 244/173 |
| 2002/0190161 A1 | * | 12/2002 | Patel et al. | 244/161 |

* cited by examiner

Primary Examiner—Michael J. Carone
Assistant Examiner—Gabriel S. Sukman
(74) Attorney, Agent, or Firm—Knobbe, Martens, Olson & Bear, LLP

(57) ABSTRACT

An inflatable boom for space applications, and a methods of folding and deploying a boom are disclosed. The boom comprises a membrane having a substantially tapered cylindrical shape. A wide end of the membrane is attached to a base, and a narrow end of the membrane is attached to a mandrel. The method of folding a boom comprises forming a plurality of ring-shaped folds in the boom membrane. The method of deploying a boom comprises increasing a gas pressure inside the boom and repeatedly unfolding the outer-most ring fold increase the length of the boom.

16 Claims, 8 Drawing Sheets

DEPLOYABLE INFLATABLE BOOM AND METHODS FOR PACKAGING AND DEPLOYING A DEPLOYABLE INFLATABLE BOOM

BACKGROUND OF THE INVENTION

1. Field of the Invention

The present invention relates to deployable structures. More particularly, the present deployable inflatable boom and methods for packaging and deploying a deployable inflatable boom provide controlled and predictable deployment behavior.

2. Description of the Related Art

Structures for use in space must be packaged, loaded into a rocket or shuttle, and launched into space. The cost of launching items into Earth orbit can exceed $10,000 per kilogram. Thus, any structure to be used in space is ideally as lightweight as possible. Further, rockets and shuttles have limited cargo space. Thus, many structures for use in space are designed to be collapsible so that they occupy little storage space relative to their deployed size. Once in space, the structures deploy to their usable configuration.

Inflatable structures offer the dual advantages of a compact packaged configuration and light weight, making them ideal for use in space. A cylindrical boom is a typical inflatable structure for use in space. Space booms are often used, for example, to support antennae and as masts for solar sails. The booms typically comprise elongated cylinders.

To package such a cylindrical inflatable boom for launch, the deflated boom is typically repeatedly folded lengthwise in an accordion fashion, such that when viewed in profile the folds in the boom trace a repeating Z. When the boom reaches orbit, pressurized gas aboard the spacecraft flows into the boom. As inflation proceeds, the boom unfolds.

Accordion folding, however, creates stress and wear along the creases in the boom. At each crease, a portion of the boom forms an outer layer and an adjacent portion of the boom forms an inner layer. The outer layer stretches as it is folded around the inner layer. The stretching weakens the boom at the creases, and makes the boom prone to fail during or after inflation. Boom failure typically prevents proper functioning of apparatus that was to be supported by the boom. Since space structures are often deployed aboard unmanned spacecraft, repairs to failed booms and malfunctioning apparatus are often impossible or too costly. Thus, failed booms can cause multi-million dollar spacecraft to be abandoned and left floating in space.

Stress and wear caused by accordion folding also complicates testing for booms. During testing, booms are typically packaged, deployed, deflated, and repackaged multiple times. The repeated folding and unfolding increases the stress and wear on the boom, thereby increasing the likelihood that the boom will fail during testing and prevent an accurate assessment of the boom's capability to perform as desired.

Accordion folding also causes booms to deploy in an unpredictable fashion due to the effects of small inflation transients and friction between parts of the deploying boom. These effects can cause sudden changes in the deployment behavior of a boom or large gyrations in the movement of the deploying boom end. Preferably, however, a boom deploys in a predictable manner. The boom may damage or become caught upon neighboring structures if it does not deploy as desired.

During packaging of an inflatable boom, gas inside the boom is vented through the base of the boom to make the boom as small as possible. In space there is negligible pressure. Thus, even a miniscule amount of gas left inside the boom during packaging can produce high pressure within the boom after it is launched into space. With the accordion-fold method of packaging a boom, the vented gas must travel through a substantial length of the boom to be vented at the base of the boom. This substantial length coupled with friction between contacting inner surfaces of the boom causes small pockets of gas to collect near the folds of the packaged boom. This gas is never vented through the base of the boom. When the boom is launched into space, this residual gas further exacerbates the problem of uncontrolled and sudden partial deployment of the boom.

The accordion-fold method of packaging a boom is also not amenable for boom that to be used as a spar to support a membrane structure, such as a solar sail, a shade, or a reflecting surface. Multiple connectors along the boom's length attach the membrane to the boom. Further, the membrane is folded and packaged with the boom. This packaging is very complex, and subjects the membrane to a high probability of damage during the folding and unfolding processes.

SUMMARY OF THE INVENTION

The preferred embodiments of the present boom and methods for packaging and deploying a boom have several features, no single one of which is solely responsible for their desirable attributes. Without limiting the scope of this boom and methods as expressed by the claims that follow, their more prominent features will now be discussed briefly. After considering this discussion, and particularly after reading the section entitled "Detailed Description of the Preferred Embodiments," one will understand how the features of the preferred embodiments provide advantages, which include high packing density, controlled and predictable deployment, easy attachment of apparatus, such as a solar sail, high stiffness and strength, including high buckling strength, for minimum weight, easy packaging of apparatus together with the boom, sails can be attached to the boom using a following load that avoids high bending moments, capability to support very large structures, higher natural frequency than cylindrical boom of same radius, and minimum gas path length for more effective pre-launch venting.

A preferred embodiment of the present boom comprises an inflatable tapered cylindrical boom. The boom includes a substantially disk-shaped base, a membrane shaped substantially as a tapered cylinder, and a substantially cylindrical mandrel. A first wide end of the membrane is secured to the base, and a second narrow end of the membrane is secured to the mandrel.

Another preferred embodiment of the present boom comprises a method for packaging an inflatable tapered cylindrical boom. The method comprises the step of forming a plurality of folds in the boom, wherein each fold has a substantially circular shape when viewed from an end of the boom.

Another preferred embodiment of the present boom comprises a method for deploying an inflatable tapered cylindrical boom. The method comprises the step of increasing a gas pressure inside the boom, thereby unfolding an outermost ring fold and elongating the boom.

BRIEF DESCRIPTION OF THE DRAWINGS

The preferred embodiments of the deployable inflatable boom and methods for packaging and deploying a boom, illustrating its features, will now be discussed in detail. These embodiments depict the novel and non-obvious boom and methods shown in the accompanying drawings, which are for illustrative purposes only. These drawings include the following figures, in which like numerals indicate like parts.

Those of skill in the art will appreciate that the dimensions of the deployable inflatable booms and the relationship between the largest and smallest diameters of said booms may be exaggerated in the above figures for illustrative purposes.

DETAILED DESCRIPTION OF THE PREFERRED EMBODIMENTS

Figure 1:
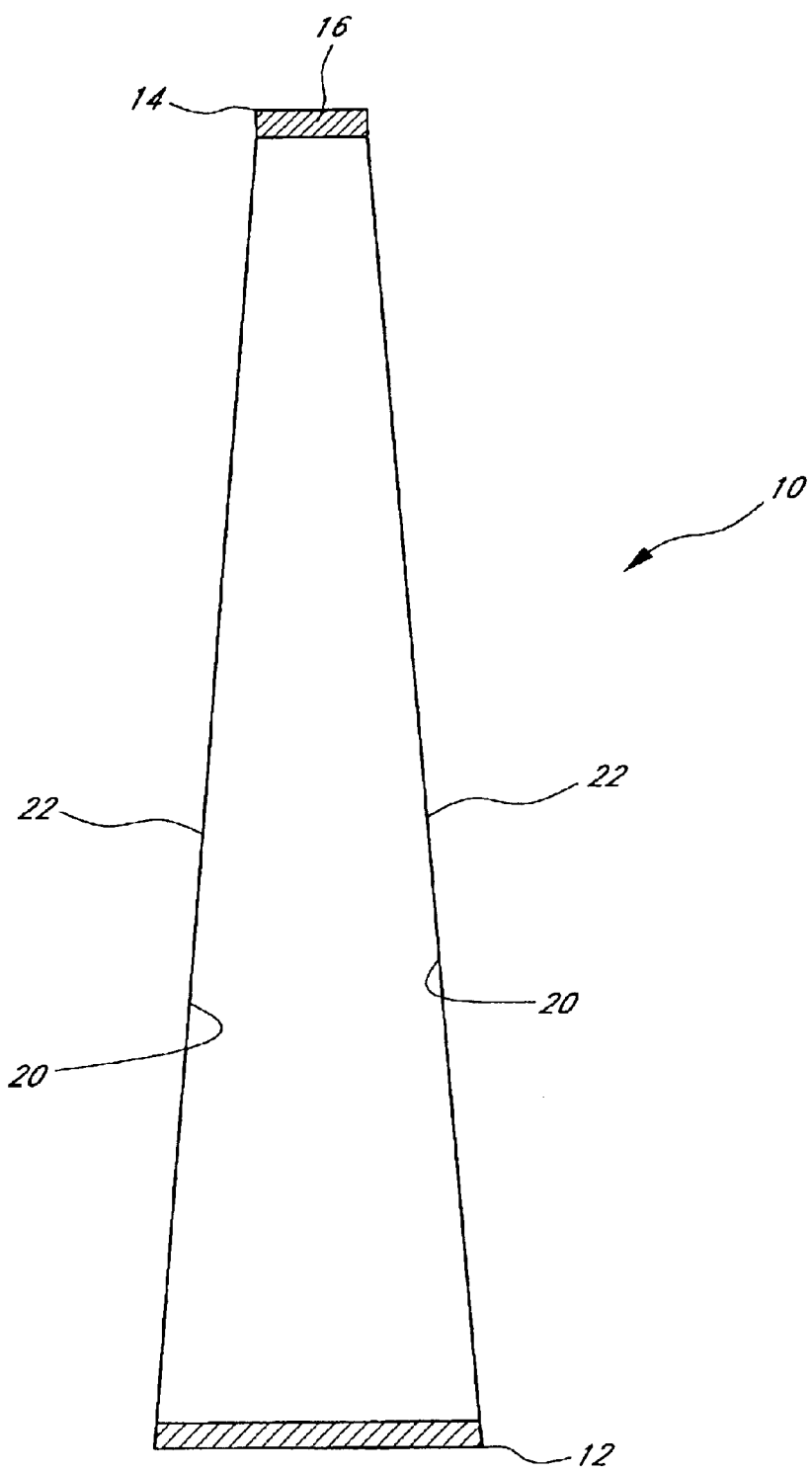
FIG. 1 is a schematic cross-sectional side view of a preferred embodiment of the deployable inflatable boom and methods for packaging and deploying a deployable inflatable boom according to the present invention, taken along the line 1—1 in FIG. 4, illustrating the boom in a fully deployed configuration.
Figure 4:
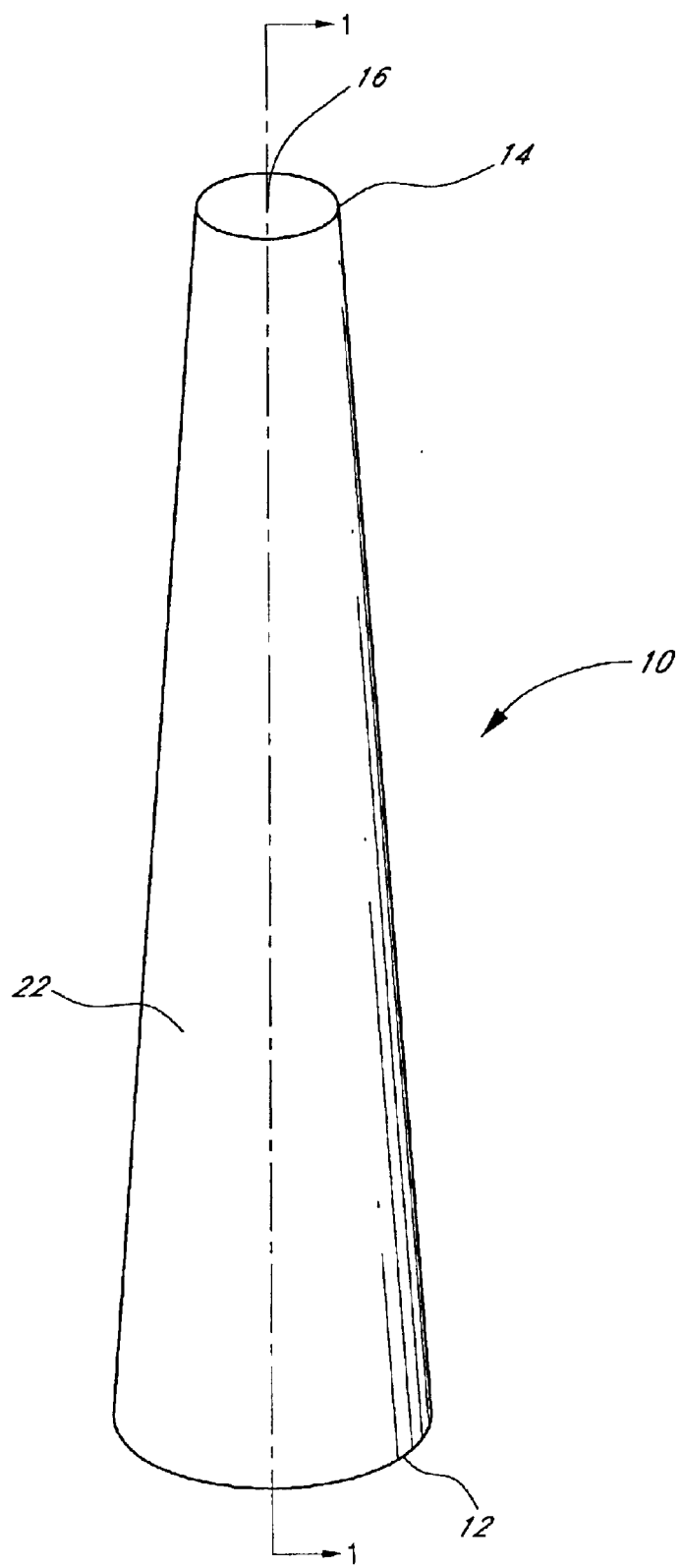
FIG. 4 is a schematic front perspective view of the boom of FIG. 1, illustrating the boom in a fully deployed configuration.
Figure 7:
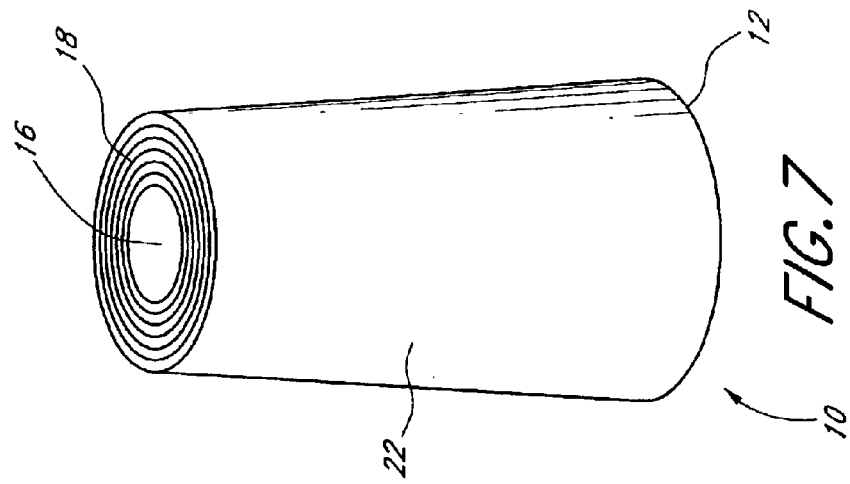
FIG. 7 is a schematic front perspective view of the boom of FIG. 1, illustrating the boom in a partially deployed configuration.

FIGS. 1 and 4 schematically illustrate a preferred embodiment of the present inflatable boom 10 in its fully deployed configuration. The boom 10 is preferably shaped substantially as a tapered cylinder, having a larger diameter at a base 12 and a smaller diameter at a tip 14. In use, the base 12 is secured to a spacecraft 28 (FIGS. 9 and 10 ) and the length of the boom 10 between the base 12 and the tip 14 is adapted to support a variety of apparatus such as antennae and solar sails, for example. Advantageously, the boom 10 is capable of supporting very large structures, as described below. Preferably, the tip 14 includes an attached mandrel 16. The mandrel 16 is preferably shaped like a cylinder, and may be tapered depending upon the characteristics of the boom 10, as described below. The mandrel 16 contributes to the boom's predictable deployment, as described below. The mandrel 16 also provides-an attachment point for instruments 30 that the spacecraft 28 deploys.

The tapered cylindrical configuration of the boom 10 provides many advantages over a typical cylindrical boom. First, a tapered boom can reduce boom mass by as much as 40% without any loss in bending buckling strength. Catenaries generally connect solar sails to the boom. The catenaries provide a homogenous tension throughout the sail to remove wrinkles, avoid stress concentrations, and raise the membrane natural frequency for optimum spacecraft control. The tension in the catenaries produces longitudinal compressive loads in the boom. Increasing the number of attachment points along the boom mitigates the compression effects and reduces long column buckling loading. The boom is thus able to withstand greater compressive loading, particularly under orbital maneuvering conditions. Mitigation of the compressive effects causes the bending moments at the base of the boom to be the loads sizing the boom. The lowest mass boom that resists these concentrated bending loads is a tapered boom having a large diameter at the base and a smaller diameter at a tip where the bending moments are much lower.

Second, the taper aids rigidization of the boom 10 using a UV rigidization process, described below. Third, a tapered tube has a higher natural frequency than a cylindrical tube of the same base radius. Fourth, a tapered tube can be packaged by forming a plurality of ring-shaped folds, and nesting folds at the narrow end of the tube within folds at the wide end of the tube. This packaging method, described in detail below, advantageously provides the present boom 10 with high packing density, and controlled and predictable deployment behavior. This packaging method also enables membranes, such as solar sails, to be folded and packaged with the boom 10.

Figure 2:
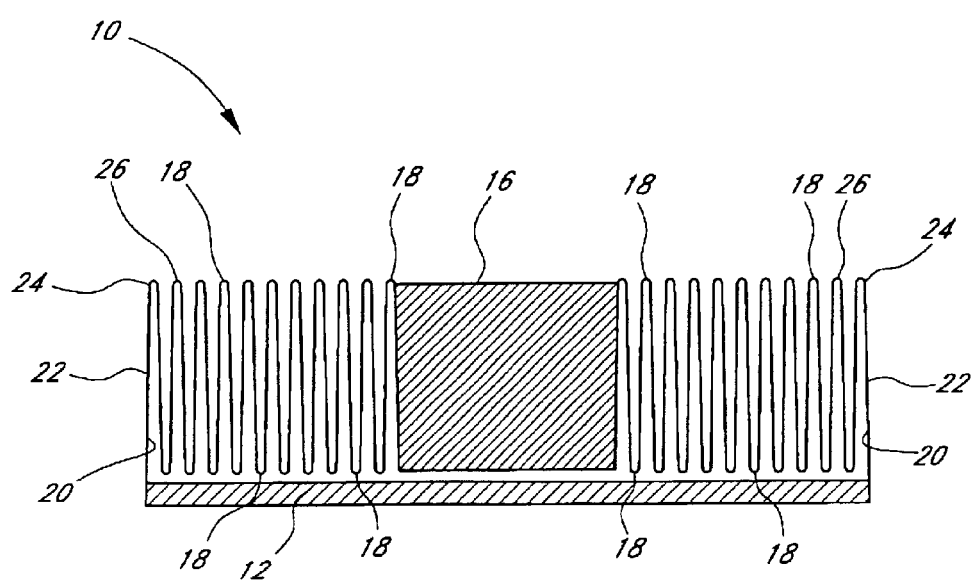
FIG. 2 is a schematic cross-sectional side view of the boom of FIG. 1, taken along the line 2—2 in FIG. 5, illustrating the boom in a packaged configuration.
Figure 5:
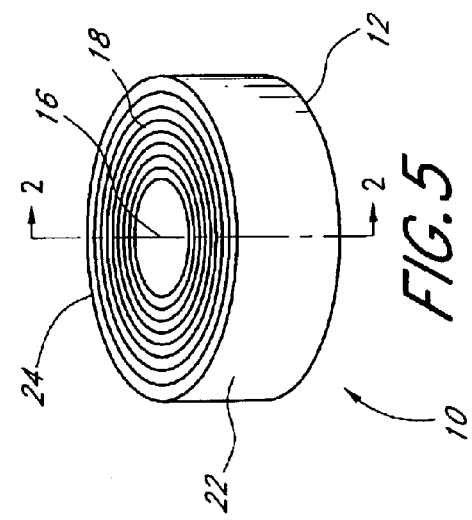
FIG. 5 is a schematic front perspective view of the boom of FIG. 1, illustrating the boom in a packaged configuration.

FIGS. 2 and 5 schematically illustrate the inflatable boom 10 in its packaged configuration. The boom 10 in its packaged configuration comprises multiple concentric ring folds 18. For clarity, separation between contiguous folds in FIG. 2 has been exaggerated. Typically, surfaces between neighboring folds 18 abut one another. Also for clarity, the boom 10 of FIG. 5 includes fewer folds than the boom 10 of FIG. 2. Those of skill in the art will appreciate that the boom 10 could have any number of folds depending upon, for example, the boom's length, the boom's intended purpose, and the packaging constraints aboard the spacecraft.

The tapered cylindrical configuration of the boom 10 enables folds near the mandrel 16 to fit within folds distant from the mandrel 16. Each fold 18 comprises a single layer of boom material, in contrast to the accordion-style folding pattern described above in which each fold comprises an inner and an outer layer of material. Thus, the material of the present boom 10 does not stretch at the ring folds 18 as it does in the accordion-style folding pattern. The material of the present boom 10 thus does not develop significant stresses at the folds 18 that tend to weaken the material and cause failure.

The present ring-style folding pattern advantageously allows the boom 10 to be compactly packaged, such that it occupies little space aboard the spacecraft. For example, a boom having a deployed length of over one-hundred feet can be collapsed to a packaged configuration having a height of only a few inches. Preferably, a length of material between each fold 18 is approximately equal to a height of the mandrel 16. A height of the packaged boom 10 is thus approximately equal to a height of the mandrel 16 plus a thickness of the base 12. The ring-style folding pattern also reduces the gas path length for more effective pre-launch venting. Completely evacuating the boom 10 prior to launch avoids the problems associated with residual gas described above with regard to the traditional accordion-style folding pattern.

Figure 8:
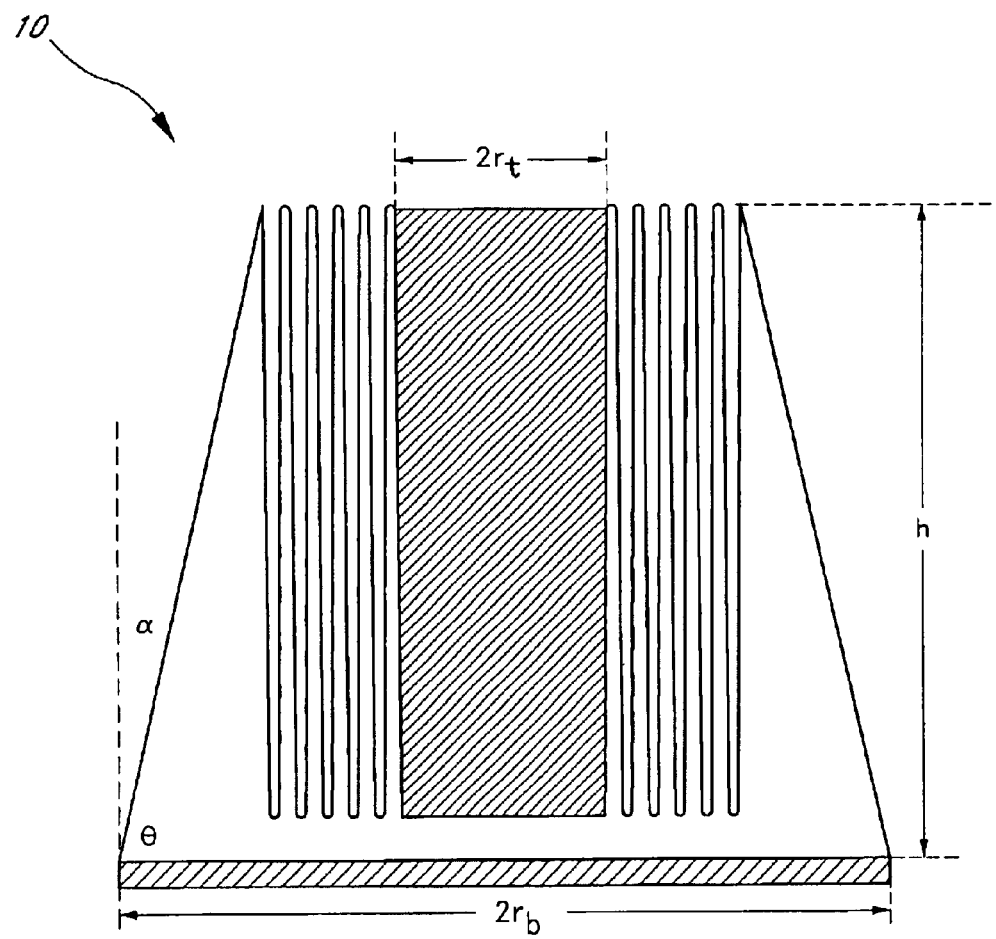
FIG. 8 is a schematic cross-sectional side view of the boom of FIG. 1, illustrating the packaging parameters of the boom.

FIG. 8 illustrates a schematic view of a packaged boom 10 in cross-sectional side view. With reference to FIG. 8, the relationship among the boom parameters in the ring-style folding pattern just described is given by the following equation:

$$(\epsilon t)(N-1)^2 - [(r_b - r_t) - \epsilon t](N-1) + L \tan \alpha - (r_b - r_t) = 0$$

where:

| | |
|---|---|
| θ = | the taper angle; |
| N = | the number of folds; |
| t = | the thickness of the boom material at the seam; |
| L = | the deployed length of the boom; |
| $r_b$ = | the cross-sectional radius of the boom at its base; |
| $r_t$ = | the cross-sectional radius of the boom at its tip; |
| ε = | the thickness correction factor; and |
| h = | the packaged height of the boom. |

Using this relationship, the packaged height of the boom 10 is given by:

$$h = \frac{L}{N}$$

The thickness correction factor ε is a property of the boom material, and is determined through experimentation. The thickness correction factor for Kevlar, which is one preferred boom material, is 1.05.

Typically, the packaged boom height h is selected to fit within available space within a spacecraft. The boom length L is selected to enable the boom 10 to perform its mission. The boom radius at its base $r_b$, at its tip $r_t$, the material thickness and the taper angle θ are all selected to provide the boom 10 with the necessary strength to withstand the expected loads that the boom 10 will encounter during its mission. Once these parameters are selected, the number of folds N is determined. The dimensions and taper angle of the mandrel 16 are determined through experimentation and iterative testing, until the mandrel dimensions yield predictable boom deployment.

The boom 10 provides, for example, a suitable support for a solar sail. Solar sails are typically attached to booms using multiple rings attached along the boom's length. The sail and the rings must be packaged together with the boom. With the present boom 10 and packaging method, rings are attachable to the boom 10 at the folds 18 that are distant from the base 12 (FIG. 2). The rings thus will not interfere with boom deployment, which is described below.

Advantageously, the present boom 10 has a controlled and predictable deployment pattern, which is illustrated in FIGS. 1–7. As inflation gas enters the collapsed boom 10 (FIGS. 2 and 5) through an. aperture (not shown) in the base 12, the gas exerts pressure on an interior surface 20 of the boom 10. The pressure causes the boom 10 to elongate (FIGS. 3 and 1, and FIGS. 6, 7 and 4). Because in space the pressure on an exterior surface 22 of the boom 10 is near vacuum, the interior of the boom 10 requires very little gas to achieve full inflation. Thus, the overall launch mass of the boom apparatus is low, because the spacecraft need not carry a large amount of compressed gas to fill the boom 10.

Friction between abutting boom surfaces resists boom elongation. However, as inflation gas flows into the boom 10, the gas penetrates the areas between these surfaces, separating the folds 18 and decreasing the frictional resistance to elongation. The longitudinal inflation force is a function of radius squared. Thus, an outermost fold 24 (FIGS. 2 and 5) of the packaged boom 10 experiences the greatest longitudinal inflation force, and tends to deploy first.

Figure 3:
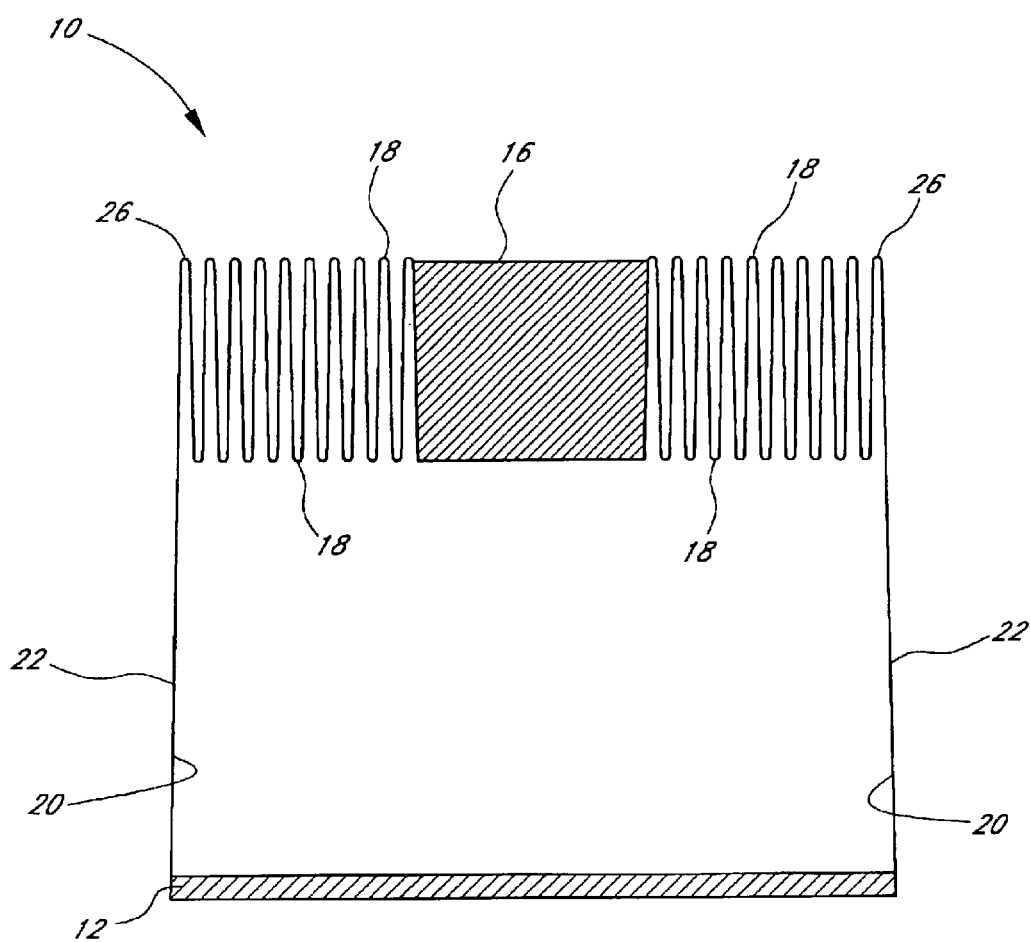
FIG. 3 is a schematic cross-sectional side view of the boom of FIG. 1, taken along the line 3—3 in FIG. 6, illustrating the boom in a partially deployed configuration.
Figure 6:
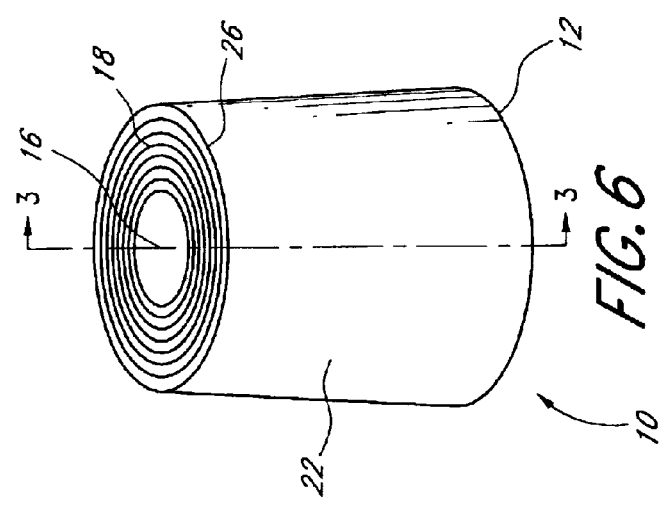
FIG. 6 is a schematic front perspective view of the boom of FIG. 1, illustrating the boom in a partially deployed configuration.

FIGS. 3 and 6 illustrate the configuration of the boom 10 after the outermost fold 24 has deployed. The length of the boom 10 has increased. The inner folds 18 have retained their packaged configuration, such that the second outermost fold 26 in FIGS. 2 and 5 has become the outermost fold 26 in FIGS. 3 and 6. As inflation gas continues to fill the interior of the boom 10, this outermost fold 26 deploys and the boom 10 assumes the further lengthened configuration of FIG. 7. As deployment continues, each successive fold 18 deploys, one at a time, from the outside of the boom 10 toward the mandrel 16. When all folds 18 have deployed, the boom 10 assumes the fully deployed configuration of FIGS. 1 and 4.

The mandrel 16 may include specialized forms and fittings forms interaction with other elements of a space structure. Typically, inflatable booms are used as supports in reflector and concentrator structures. These structures are made of lightweight thin films and, therefore, generate very light loads on the booms because they (reflectors and concentrators) are usually operated at very low pressures. $10^{-6}$ psi is common.

Certain applications require inflatable booms that are capable of sustaining large applied loads. These booms operate at greater pressures. Certain other applications require booms having life spans longer than five to ten years. Both of these types of applications require a larger supply of inflation gas and/or make up gas. Often it is not practical launch a large supply of gas into space. Therefore, many inflatable booms rigidize after they are deployed so that sustained inflation is not necessary to maintain the boom's structural integrity.

One rigidization technique involves constructing the boom from sub-glass transition temperature materials. Sub-glass transition temperature materials are pliant at temperatures above the glass transition temperature, but become stiff at temperatures below the glass transition temperature. The present boom 10 may be constructed using one of these materials. The boom is maintained at a temperature above the glass transition temperature prior to deployment. After deployment, exposure to the space environment cools the boom below the glass transition temperature and the boom becomes rigid. Following rigidization, no additional internal gas pressure is needed to maintain the boom in its deployed configuration.

Preferably, the glass transition temperature of the material is above the anticipated ambient operating temperature of the boom 10 to avoid the boom 10 becoming pliant after deployment. If the temperature of the material rises above its glass transition temperature, structural integrity of the boom 10 could be lost. This potential failure limits the mission of a boom using sub-glass transition temperature rigidization.

Examples of sub-glass transition temperature materials are neoprene-coated Kevlar, and carbon and/or Kevlar fibers impregnated with resins. Various resins provide different glass transition temperatures. Therefore, the glass transition temperature of a particular boom can be tailored to be compatible with the anticipated operating environment of the boom.

Another rigidization technique involves ultraviolet (UV) radiation. UV rigidization employs a fibrous boom material that is impregnated with a resin that cures when exposed to ultraviolet light. Advantageously, UV radiation is only needed to initiate the resin curing, not sustain the resin curing. Thus, once the resin cures, no additional energy input is required to maintain the boom's rigid deployed configuration. Further, the mission of the boom 10 is not limited by concerns about loss of boom rigidization, as compared to sub-glass transition methods of boom rigidization.

Preferably, the fibrous material is transparent to UV radiation. A preferred material for UV rigidization is fiberglass. UV radiation striking the boom surface will thus cure the resin through the entire thickness of the material, rather than only curing the resin near the material surface. The entire thickness of the boom 10 may comprise a resin-impregnated material. Alternatively, only an inner or outer surface of the boom 10 may comprise a resin-impregnated material. If only an inner surface of the boom 10 comprises a UV curable resin-impregnated material, the boom 10 will be protected from solar UV radiation prior to and during boom deployment so that the boom remains pliant until fully deployed.

In one UV rigidization method, only an inner surface of the boom 10 comprises a UV curable resin-impregnated material. Following deployment, a UV-transparent aperture in the boom enables solar UV radiation to penetrate the boom interior and cure the inner surface. This rigidization method advantageously requires no spacecraft power.

In another UV rigidization method, a source of UV radiation, such as one or more UV lamps, is located within the boom 10. Following deployment, the UV lamps are turned on. With either method, the tapering of the boom 10 facilitates distribution of the UV radiation over the entire surface of the boom 10 through reflection.

Figure 9:
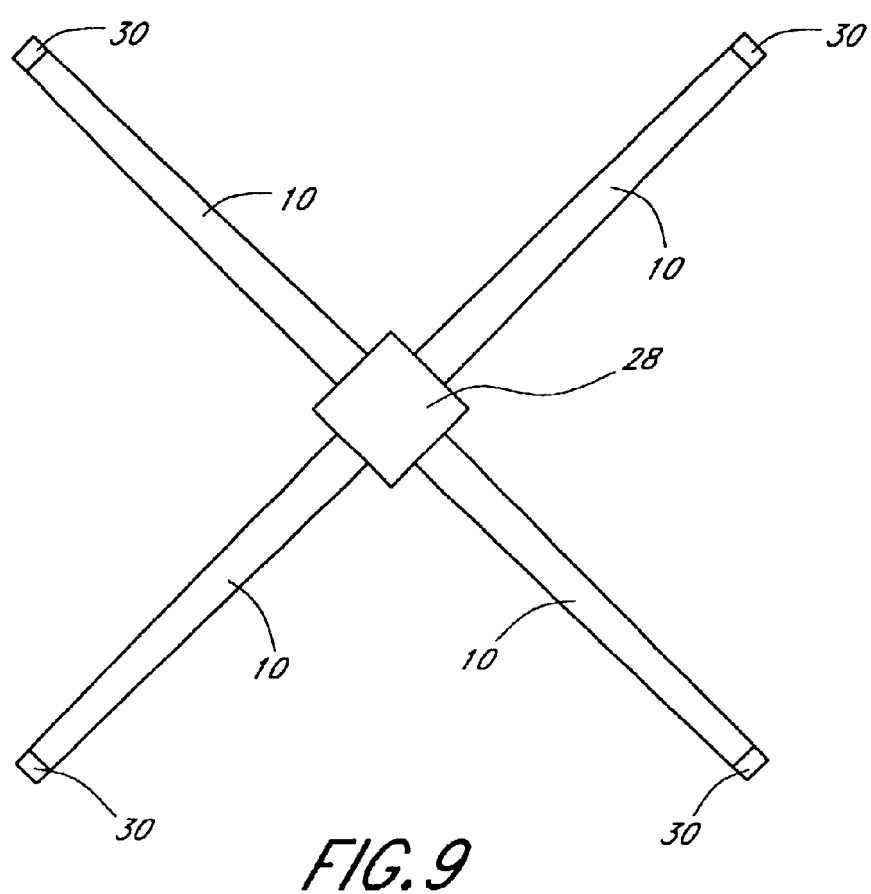
FIG. 9 is a schematic view of a spacecraft including four of the booms of FIG. 1 with attached instruments.

FIG. 9 illustrates a spacecraft 28 including multiple booms 10. The booms 10 extend from the spacecraft 28 in a four-spoke, X-shaped pattern. Each boom 10 includes an instrument 30 at its tip. This spacecraft configuration advantageously places instruments 30 in a controlled manner at a substantial distance from the spacecraft 28, using a lightweight and highly reliable support in the form of the present inflatable boom 10. Locating instruments 30 at a distance from the spacecraft 28 is advantageous for many applications, including interferometry and magnetometry.

Many instruments 30 require electronic or fiber optic connections between the spacecraft 30 and the instruments 30. The ring-style folding pattern of the present boom 10 enables these connections to be packaged inside the boom 10 without the need to traverse multiple "Z" folds, which can strain the connections and lead to their failure. The connections may simply be coiled at the interior of the base 12 of the boom 10. As the boom 10 deploys, the movement of the instruments 30 away from the base 12 uncoils the connections.

Figure 10:
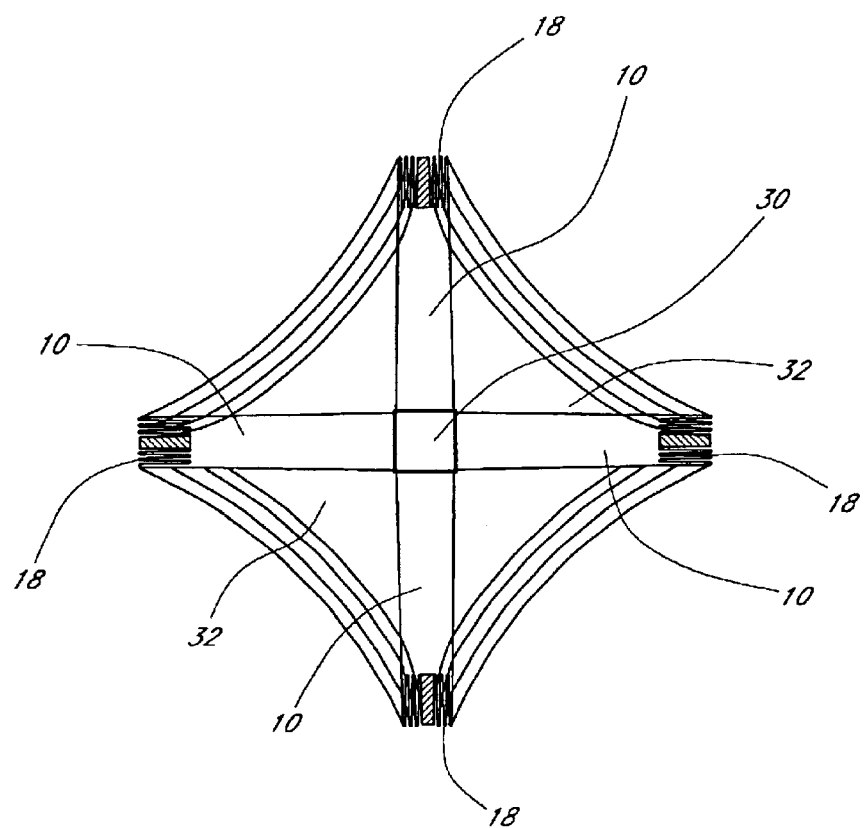
FIG. 10 is a schematic view of a spacecraft including four of the booms of FIG. 1 with an attached solar sail.

FIG. 10 illustrates the spacecraft 30 including four partially deployed booms 10. The booms 10 are connected at several folds 18 to a membrane, such as. a solar sail 32. As the booms 10 deploy, the sail 32 unfurls. The ring-style folding pattern of the present boom 10 advantageously positions the connection points between the booms 10 and the sail 32 at the exposed end of the booms 10. The sail 32 thus need not be folded within the packaged boom, as is required with the traditional accordion-style boom packaging method.

Scope of the Invention

The above presents a description of the best mode contemplated for carrying out the present deployable inflatable boom and method for packaging a deployable inflatable boom, and of the manner and process of making and using it, in such full, clear, concise, and exact terms as to enable any person skilled in the art to which it pertains to make and use this deployable inflatable boom and method for packaging a deployable inflatable boom. This deployable inflatable boom and method for packaging a deployable inflatable boom is, however, susceptible to modifications and alternate constructions from that discussed above that are fully equivalent. Consequently, this deployable inflatable boom and method for packaging a deployable inflatable boom is not limited to the particular embodiments disclosed. On the contrary, this deployable inflatable boom and method for packaging a deployable inflatable boom covers all modifications and alternate constructions coming within the spirit and scope of the deployable inflatable boom and method for packaging a deployable inflatable boom as generally expressed by the following claims, which particularly point out and distinctly claim the subject matter of the deployable inflatable boom and method for packaging a deployable inflatable boom.

What is claimed is:

1. A method for deploying a deployable inflatable boom, the method comprising the steps of:
    providing an elongate cylindrical tube having a first end and a second end, the tube being tapered from a larger cross-sectional area near the first end to a smaller cross sectional area near the second end, the tube including a plurality of ring folds, each fold having a substantially circular shape when viewed from an end of the tube, the tube being constructed of a material that is pliant at temperatures above a glass transition temperature, but becomes rigid at temperatures below the glass transition temperature; and
    introducing an inflation gas into a hollow interior of the tube, thereby unfolding an outer-most ring fold and elongating the tube.

2. The method of claim 1, further comprising the step of rigidizing the tube by exposing the tube material to a temperature below the glass transition temperature.

3. A method for deploying a deployable inflatable boom, the method comprising the steps of:
    providing an elongate cylindrical tube having a first end and a second end, the tube being tapered from a larger cross-sectional area near the first end to a smaller cross-sectional area near the second end, the tube including a plurality of ring folds, each fold having a substantially circular shape when viewed from an end of the tube, the tube being constructed of a material that cures upon exposure to ultraviolet radiation; and
    introducing an inflation gas into a hollow interior of the tube, thereby unfolding an outer-most ring fold and elongating the tube.

4. The method of claim 3, further comprising the step of rigidizing the tube by exposing the tube material to ultraviolet radiation.

5. A deployable inflatable boom for supporting structures in space, the boom comprising:
    an elongate cylindrical tube having a first end and a second end, the first end being secured to a base structure, the tube being tapered from a larger cross-sectional area near the first end to a smaller cross-sectional area near the second end; and
    a cylindrical mandrel secured to the second end; wherein
    the tube includes a plurality of folds, each fold having a substantially circular shape when viewed from an end of the tube; and
    the tube is constructed of a material that is pliant at temperatures above a glass transition temperature, but becomes rigid at temperatures below the glass transition temperature.

6. The deployable inflatable boom of claim 5, wherein the tube is constructed of a neoprene-coated polymer.

7. The deployable inflatable boom of claim 5, wherein the tube is constructed of resin-impregnated carbon fibers.

8. The deployable inflatable boom of claim 5, wherein the tube is constructed of resin-impregnated polymer fibers.

9. A deployable inflatable boom for supporting structure in space, the boom comprising:

an elongate cylindrical tube having a first end and a second end, the first end being secured to a base structure, the tube being tapered from a larger cross-sectional area near the first end to a smaller cross-sectional area near the second end; and a cylindrical mandrel secured to the second end; wherein the tube includes a plurality of folds, each fold having a substantially circular shape when viewed from an end of the tube; and the tube is constructed of a material that cures upon exposure to ultraviolet radiation.

10. The deployable inflatable boom of claim 9, wherein the tube is constructed of a resin-impregnated fibrous material.

11. A deployable inflatable boom for supporting structures in space, the boom comprising:

an elongate cylindrical tube having a first end and a second end, the first end being secured to a base structure, the tube being tapered from a larger cross-sectional area near the first end to a smaller cross-sectional area near the second end; wherein the tube is constructed of a material that is pliant at temperatures above a glass transition temperature, but becomes rigid at temperatures below the glass transition temperature; and the tube includes a plurality of folds, each fold having a substantially circular shape when viewed from an end of the tube.

12. The deployable inflatable boom of claim 11, wherein the tube is constructed of a neoprene-coated polymer.

13. The deployable inflatable boom of claim 11, wherein the tube is constructed of resin-impregnated carbon fibers.

14. The deployable inflatable boom of claim 11, wherein the tube is constructed of resin-impregnated polymer fibers.

15. A deployable inflatable boom for supporting structures in space, the boom comprising:

an elongate cylindrical tube having a first end and a second end, the first end being secured to a base structure, the tube being tapered from a larger cross-sectional area near the first end to a smaller cross-sectional area near the second end; wherein the tube is constructed of a material that cures upon exposure to ultraviolet radiation; and the tube includes a plurality of folds, each fold having a substantially circular shape when viewed from an end of the tube.

16. The deployable inflatable boom of claim 15, wherein the tube is constructed of a resin-impregnated fibrous material.

* * * * *